United States Patent Office 3,052,583
Patented Sept. 4, 1962

3,052,583
METHOD FOR MANUFACTURING RESIN-BONDED PRODUCTS MADE FROM INORGANIC FIBERS
Börge Ingmar Carlström, Strandbaden, and Karl Axel Rumberg, Viken, Sweden, assignors, by mesne assignments, to Hoeganaes Development Co. Ltd., Toronto, Ontario, Canada, a company of Canada
No Drawing. Filed May 28, 1959, Ser. No. 816,387
2 Claims. (Cl. 156—38)

Different kinds of inorganic fibres, particularly glass fibres, but also slag and mineral wool, have been used for the production of resin-bonded products. Examples of such bonded products are felts or mats for the insulation of vessels for hot water, bats for the insulation of refrigerators, semi rigid boards for the insulation of walls in buildings, rigid boards for sound-insulating, rigid sections for tube insulating and thin mats for filters or reinforcing purposes.

A problem in the manufacture of such resin-bonded products has been to find a suitable binding agent which will give a satisfactory bond between the fibres and which retains this bond to a high degree, even when the bonded products are exposed to humidity. The resistance after exposure to humid air is especially low for products made from fibres of a material, which in itself has a low hydrolytic resistance, as is the case with cheap glass containing high amounts of alkali.

With the hitherto used binders it has been attempted to overcome the difficulties in two different ways. Those are.
(1) Increasing the amount of binders
(2) Using a starting material for the fibres with a high hydroyltic resistance The first of these steps has the disadvantage that the product contains a high amount of organic material and therefore may be flammable. Also the binder is much more expensive than the fibres, and therefore it may be economically unsatisfactory to increase the content of binders. It also very often occurs, that the increased content of binder does not bring about the desired effect, and at least this method cannot be used with advantage for the manufacture of soft products, because the increased content of binder results in increased stiffness.

The use of a more hydrolytically resistant material for the manufacture of the fiber causes increased cost, because such material has to be made from expensive chemicals, especially boric acid. The melting cost for the starting material is also increased on account of a higher melting temperature and the increased attack on the refractories of the melting furnace.

The present invention relates to resin bonded products from inorganic fibres, and to a method for their manufacture, by means of which the above mentioned disadvantages are substantially avoided. The invention is based upon the use of a modified resinous binder of that type which is the object of our copending application Ser. No. 808,319, filed April 23, 1959. Through the use of such binders in making glass fiber products it is not only possible to make bonded products with sufficient strength from glass or other fiber-forming material with low hydrolytic resistance but it is also possible to make such products satisfactorily with a lower content of binder than has been possible in previous production of corresponding products. Also when using a starting material with a high hydrolytical resistance for the manufacture of the fibres it is possible to obtain equally good or even better results with decreased quantities of this modified resinous binder than has been possible to obtain with any method hitherto used and with hitherto normally used binders.

A resin-bonded fiber product according to the invention thus is made from inorganic siliceous fibres in the form of a felt, mat, board or sections for tube insulation, where the fibres are held together with a resinous binder which is well known for this purpose in an amount of between 1–15% of the weight of fibre material adjusted according to the stiffness or hardness desired, this binder being modified by an addition of an organic silicon compound of the general type $R_nSiX_{4-n}$, where R is an organic radical, containing an amino group, aldehyde group or phenolic hydroxyl group reactive with the resin used, X consists of an hydroxyl group, an alkoxy group, aroxy group or halogen and $n$ is the number 1, 2 or 3. The modifying agent can be used in a content of 0.025 to 5% and suitably 0.075 to 1% calculated on the solid content of the resinous binder used.

The procedure according to the invention is mainly characterized in that the fiber material is treated with such an amount of the resinous binder modified as described above that the solid content of the binder calculated on the weight of the fiber material according to the stiffness or hardness wanted in the material and with regard to the fiber used will be between 1 and 15%, after which the binder is cured.

The binder is added to the fiber material in a usual way. It may be sprayed in the form of solution, emulsion or suspension on to the fibres direction in connection with their manufacture, usually in a hood built for that purpose.

When the binder has been added, the path of fibers is brought into a curing oven, where the binder is cured in the usual way.

In order to explain the very good results which are obtained according to the invention, those testing methods are now to be described, which were used to judge the hydrolytical resistance of the starting material for the manufacture of the fibres and to judge the adhesion between fiber and binder.

The hydrolytical resistance of a siliceous material e.g. glass is measured on powders, which are sieved to 100–140 mesh.

From this powder 10 g. are weighed out, which are boiled with 30 cc. water for three hours in a 50 cc. measuring flask. After cooling, distilled water is added to the 50 cc. mark. 25 cc. are pipetted and titrated with 0.05 N HCl to a pH of 7. The amount of hydrochloric acid required is given as a measure of the hydrolytical resistance. This means that a lower amout of acid signifies a better resistance.

For the determination of the adhesion a fiber is drawn from a platinum bushing with one hole in the bottom, and containing the glass melt by means of a rotating drum with a diameter of 125 mm. The temperature of the melt and the number of revolutions are so adjusted that with different melts the same fiber diameter is obtained. With a hole of 1 mm. in the platinum bushing a temperature of 1250° C. is normal when the number of revolutions is 3000 r.p.m. The fiber is drawn for 5 minutes and binder is applied to the fiber before it is wound on the drum. The bundle of fibers obtained is cut off and more binder is added. The bundle is dried at room temperature, whereafter the binder is cured at increased temperature with the bundle hanging down. From the bonded bundles, obtained in the form of rods, 9 cm. long rods are thereafter cut. Ten rods are tested directly for flexural strength in an apparatus with a distance between the supports of 50 mm. Rupture does not occur through breakage of the fibers but through loosening of the fibers from each other. The load necessary for rupture thus is a measure of the adhesion. Ten other rods were first exposed to humid air (saturated) for a week, before they were tested for flexural strength, which thus became a measure of the adhesion after treatment in humidity.

Below are given some examples of how the adhesion measured in the above mentioned way may be increased through the use of the binders modified according to the invention.

EXAMPLE 1

Fibers were made from a glass containing 4% boric acid and 12% alkali and with a hydrolytical resistance of 0.9. The adhesion was measured on rods with a binder content of 6% (solids) of which a part was made using normal phenolic resin and another part with resin modified according to the invention with 0.4% aminopropyltriethoxysilane:

|  | Normal resin | Modified resin |
| --- | --- | --- |
| Rupture load before treatment in humidity_____g__ | 420 | 580 |
| Rupture load after treatment in humidity_____g__ | 200 | 560 |
| Remaining strength_____percent__ | ~50 | ~100 |

EXAMPLE 2

The same test as in Example 1 was made on fibers made from a glass containing 0.5% boric acid and 14% alkali and with a hydrolytical resistance of 3.5 with the following result:

|  | Normal resin | Modified resin |
| --- | --- | --- |
| Rupture load before treatment in humidity_____g__ | 350 | 460 |
| Rupture load after treatment in humidity_____g__ | 40 | 480 |
| Remaining strength_____percent__ | ~10 | ~100 |

EXAMPLE 3

Fibers from a glass with a hydrolytical resistance of 5.6 containing 15% alkali gave the following result:

|  | Normal resin | Modified resin |
| --- | --- | --- |
| Rupture load before treatment in humidity_____g__ | 270 | 510 |
| Rupture load after treatment in humidity_____g__ | 0 | 250 |
| Remaining strength_____percent__ | 0 | ~70 |

EXAMPLE 4

This example relates to the testing of boards made from glasswool with a fiber diameter of 20–25 microns, made according to the Hager process, i.e. by centrifuging a melt of glass with a rapidly rotating ceramic disk. The boards have been made from a glass with a hydrolytical resistance of 4.0 and have been bonded part of them with normal resin and part of them with a phenolic resin modified according to the invention with 0.3% aminopropyltriethoxysilane. The boards tested had a density of 150 kg./m.$^3$ and a thickness of 30 mm. The resistance of the binder is in this case measured as the percentage increase in thickness of the boards (swelling) after having been exposed to air at room temperature with a humidity content of 90–95%. The swelling of the boards is due to the fact that the tension in the long and coarse fibers overcomes the binding strength of the binder, which has been weakened through the influence of the humidity. The result of the investigation is shown in following table.

Table 1

| Time in humidity | Swelling | | | | | |
| --- | --- | --- | --- | --- | --- | --- |
|  | 16% resin in the solution | | 11% resin in the solution | | 6% resin in the solution | |
|  | Without silane, percent | With silane, percent | Without silane, percent | With silane, percent | Without silane, percent | With silane, percent |
| 1 week_____ | 10 | 0 | 20 | 0 | 24 | 0 |
| 2 weeks_____ | 15 | 0 | 35 | 0 | 52 | 0 |
| 5 weeks_____ | 29 | 0 | 46 | 0 | 64 | 0 |

In all cases the same amount of resin solution has been used for the preparation of the test boards and the content of binder calculated on the amount of fiber is consequently directly proportional to the different concentrations of the solutions of phenolic resins.

From the table it is seen that with this glass having low hydrolytical resistance it is not possible even at such high concentrations of resin as 16% when using unmodified resin to obtain a satisfying result, whereas with the same glass a completely satisfying result is obtained with 6% modified resin calculated on the weight of fiber.

EXAMPLE 5

In this example bats have been made from glass fibers, manufactured through centrifuging by a perforated cylinder to a fiber diameter of 5–7 microns. The glass used for the manufacture of the fibers was rather resistant and had a hydrolytical resistance of 1.2. The bats, part of which were bonded with normal phenolic resin and part of which were bonded with a phenolic resin modified with 0.15% of aminopropyltriethoxysilane, had a density of 15 kg./m.$^3$. In this case the changes in the binding strength of the bats under influence of the humidity were measured as variation in the thickness, down to which the bats were compressed by subjecting them to a load of 100 kg./m.$^2$.

An increased attack by humidity results in a lower thickness under load. The result is evident from the following table.

Table 2

| Sample | Thickness under load | |
| --- | --- | --- |
|  | Bat with 9% normal resin, mm. | Bat with 6.5% modified resin, mm. |
| Before treatment in humidity_____ | 70 | 65 |
| After one month in air with 90–95% rel. humidity_____ | 55 | 60 |

As is seen from the table, a bat bonded with modified resin shows better properties in humidity with 6.5% of binder calculated on the weight of fibers, than a bat bonded with unmodified resin in the amount of 9% calculated on the weight of fibers.

We claim:

1. A method of producing resin-bonded felted mineral wool products for heat, cold and sound insulating purposes which comprises forming a stream of air carrying suspended mineral fibers, spraying into said stream a water solution containing a phenol formaldehyde resin of the resol type and from 0.075% to 1% by weight, based upon the dry weight of the phenol formaldehyde resin of an organic silicon compound of the general formula $R_nSiX_{4-n}$ in which R is an organic radical containing at least one amino group which is reactive with said phenol formaldehyde resin, X is a radical selected from the group consisting of the hydroxyl group, alkoxy groups, aroxy groups and the halogens and n is a whole number within the range from 1 to 3, the ratio between said water solution and said mineral fibers being such that from 1% to 15% by weight of dry resin calculated upon the weight of the fibers is deposited on the fibers, forming the so-treated fibers into a felt and curing the resin in the felt.

2. A method as defined in claim 1 in which the organic silicon compound is aminopropyltriethoxysilane.

References Cited in the file of this patent

UNITED STATES PATENTS

| | | |
|---|---|---|
| 2,541,896 | Vasileff et al. | Feb. 13, 1951 |
| 2,832,754 | Jex et al. | Apr. 29, 1958 |
| 2,946,701 | Plueddemann | July 26, 1960 |
| 2,974,062 | Collier | Mar. 7, 1961 |